(12) United States Patent
Kulp (10) Patent No.: US 6,855,295 B2
(45) Date of Patent: Feb. 15, 2005

(54) UV AIR CLEANING AND DISINFECTING SYSTEM

(76) Inventor: John C. Kulp, 461 Kea St., Kahului, Maui, HI (US) 96732

( * ) Notice: Subject to any disclaimer, the term of this patent is extended or adjusted under 35 U.S.C. 154(b) by 774 days.

(21) Appl. No.: 09/905,287

(22) Filed: Jul. 13, 2001

(65) Prior Publication Data

US 2002/0031460 A1 Mar. 14, 2002

Related U.S. Application Data

(60) Provisional application No. 60/219,464, filed on Jul. 17, 2000.

(51) Int. Cl.$^7$ .................................................. A61L 9/20
(52) U.S. Cl. ........................ 422/121; 422/122; 96/224
(58) Field of Search ................................ 422/121, 122; 96/224; 95/273; 454/228

(56) References Cited

U.S. PATENT DOCUMENTS

| | | | | | |
|---|---|---|---|---|---|
| 3,100,679 | A | * | 8/1963 | Kritzer ........................ | 422/121 |
| 3,518,046 | A | * | 6/1970 | Cicirello ...................... | 96/224 |
| 3,674,421 | A | * | 7/1972 | Decupper .................... | 422/121 |
| 3,846,072 | A | * | 11/1974 | Patterson ..................... | 96/222 |
| 3,998,142 | A | * | 12/1976 | Foreman et al. ............. | 454/187 |
| 4,484,517 | A | * | 11/1984 | Amann ......................... | 99/474 |
| 5,074,894 | A | * | 12/1991 | Nelson ......................... | 96/224 |
| 5,752,878 | A | * | 5/1998 | Balkany ....................... | 454/236 |
| 5,891,399 | A | * | 4/1999 | Owesen ....................... | 422/121 |
| 5,894,130 | A | | 4/1999 | Bach | |
| 2003/0217641 | A1 | * | 11/2003 | Palestro et al. ................ | 95/273 |

* cited by examiner

Primary Examiner—Elizabeth McKane
(74) Attorney, Agent, or Firm—Leighton K. Chong; Ostrager Chong & Flaherty (Hawaii)

(57) ABSTRACT

A UV air cleaning and disinfecting system has an enclosed chassis with an inlet/outlet surface panel on one planar side thereof, and the chassis is mounted in the space behind a drop ceiling with its surface panel coplanar with the ceiling surface and facing into the room space. The surface panel has a pair of inlet vent arrays on opposite longitudinal sides of the surface panel from each other, and a pair of outlet vent arrays on opposite latitudinal sides of the surface panel from each other. Arranged in the chassis are an air blower unit and an array of UV lamps. The positioning of the inlet and outlet vent arrays establish four mutually circulating air streams in a four-leaf-clover pattern in the room space, which obtains a high-efficiency throughput of air handled by the system. The UV lamp array is arranged longitudinally across the chassis between the inlet ventsat a lower elevational position of the chassis. A pair of air filters is arranged at intake chambers separated by UV-blocking baffles at opposite longitudinal sides of the main chamber housing the air blower in the center of the chassis at an upper elevational position from the array of UV lamps. The upward and downward movement of the air through the filters and over the UV lamps toward the center causes swirling movements which enhance the exposure of pathogens in the air to UV radiation exposure. The surface panel is formed with a series of cascading door sections to allow wide access across the center of the chassis for maintenance of the UV lamps, with a first door section connected to an interlock switch for cutting off electrical power to the UV lamps and fan when the first door section is opened. The UV-blocking baffles have an angled shape and slits at an upper flange thereof covered with fused silica shields. The system's chassis is dimensioned to fit on ceiling rails spaced at standard 4 foot length and 2 foot width intervals. The system can provide 99% or higher inactivation of pathogens in the air with 2 to 7 or more air changes per hour for standard sized rooms.

20 Claims, 6 Drawing Sheets

INTAKE AIR FLOW DIRECTION

UV AIR CLEANING AND DISINFECTING SYSTEM

This U.S. patent application claims the priority benefit of U.S. Provisional Application 60/219,464 filed on Jul. 17, 2000 by the same inventor, entitled Insert & Ceiling Mounted Systems for UV Air Disinfecting Unit.

TECHNICAL FIELD

This invention generally relates to UV air disinfecting and cleaning units, and more particularly, to an improved system having a layout and internal configuration for high-throughput, high-volume, and highly effective air cleaning and disinfecting of pathogens in room air spaces.

BACKGROUND OF INVENTION

UV disinfecting units are widely used in building heating, ventilation, and air cooling (HVAC) systems to kill and remove germs, fungi, and other pathogens carried in the air in order to improved the healthiness of indoor environments. A UV disinfecting unit is typically inserted at a suitable place in the return air ducting in order to kill the pathogens before they are carried into the HVAC unit and re-delivered into the inlet ducting into the building spaces. The UV unit contains one or more UV lamps which radiate ultraviolet light to kill pathogens carried in the air processed through the unit. Since the UV lamps can be harmful to human beings as well, they must be completely enclosed during operation of the UV unit, and shut off when the UV unit is opened, such as during maintenance. In U.S. Pat. No. 5,894,130, for example, a UV sterilization unit is positioned in the air return duct and has UV lamps carried in a cartridge which is interlocked with a disable switch for safety during maintenance.

UV units in HVAC systems have not been highly efficient in microbe killing capacity due to the high volumes of air required to be processed through HVAC systems resulting in a relatively low amount of UV exposure of pathogens per unit volume of air processed. In addition, HVAC systems often have multiple return air ducts leading to a single HVAC unit, so that if a UV unit in one return duct is operating at low efficiency or malfunctioning, the pathogens passed through the one unit will be spread to all building spaces when the air is carried into the HVAC unit and re-delivered to the inlet ducting into the building spaces. Furthermore, many buildings and individual offices spaces are not serviced by an HVAC system, but may have individual air conditioners installed in individual offices with no UV disinfecting capability.

With the recognition that indoor air is a major source of allergens and pathogens harmful to people in indoor spaces, some manufacturers have offered individual UV units which can be installed in a ceiling of a room or office space, or in the input duct delivering conditioned air to an individual space. Some units have combined air filtering with UV disinfecting in order to perform the combined functions of removing particulates and allergens from the air as well as killing microbes and pathogens. The conventional units typically have an inlet for an incoming air stream, a filter for removing particulates from the incoming air stream, a cavity space to channel the air stream past one or more UV lamps for killing pathogens, and a blower for moving the air through the unit to an outlet. The conventional units have common problems such as low air throughput, high blower noise if a large blower is used to increase throughput, low microbe kill rate due to inefficient UV exposure, and low air moving efficiency in terms of cleaning the majority of air contained in a room through at least several air changes per hour.

The present invention seeks to provide an improved system having high-throughput, high-volume, and highly effective air cleaning and disinfecting of pathogens in room air spaces.

SUMMARY OF INVENTION

In accordance with the present invention, a UV air cleaning and disinfecting system comprises:

(a) an enclosed chassis having an inlet/outlet surface panel on one planar side thereof, said surface panel having a longitudinal length and a latitudinal width, said chassis being adapted to be mounted in a space behind a ceiling surface of a room space with its surface panel substantially coplanar with the ceiling surface and facing into the room space;

(b) a pair of inlet vent arrays formed in the inlet/outlet surface panel for taking incoming air into the chassis, said inlet vent arrays being positioned spaced apart on opposite longitudinal sides of the surface panel from each other;

(c) a pair of outlet vent arrays formed in the inlet/outlet surface panel for delivering outgoing air from the chassis, said outlet vent arrays being positioned spaced apart on opposite latitudinal sides of the surface panel from each other; and (d) said chassis including an air blower unit for taking incoming air into the chassis and delivering outgoing air from the chassis, and an ultraviolet (UV) radiation unit for exposing air taken into the chassis to UV rays sufficient to kill microbes and pathogens therein before it is delivered from the chassis;

(e) wherein said pair of inlet vent arrays positioned on opposite longitudinal sides and said pair of outlet vent arrays positioned on opposite latitudinal sides of the surface panel are operative to establish a pair of longitudinally opposite incoming air streams normal to a pair of latitudinally opposite outgoing air streams which result in four mutually circulating air streams in a four-leaf-clover pattern in the room space.

In a preferred embodiment, the UV air cleaning and disinfecting system has a main chamber with an array of UV lamps arranged longitudinally across the chassis between the inlet vents at a lower elevational position of the chassis. The inlet vents are housed in intake chambers separated from the main chamber by UV-blocking baffles directing the incoming air through air filters into the main chamber. The air blower is positioned in the center of the chassis and at an upper elevational position from the array of UV lamps. The baffles direct incoming air upwardly through the air filters then downwardly over the UV lamp array toward the center of the chassis where it is entrained by the air blower and blown latitudinally outward on opposite sides through the outlet vents in the surface panel. The upward and downward movement of the air causes air swirling movements which enhance the exposure of pathogens in the air on many sides thereof to ensure effective UV radiation exposure of the pathogens.

The surface panel is formed with a series of cascading door sections to allow wide access across the center of the chassis for maintenance of the UV lamps, with a first door section being formed adjacent the inlet vent array at one longitudinal end of the chassis and being positioned on an outward side of the UV-blocking baffle shielding the vents from radiation from the UV lamps. The first door section is connected to an interlock switch to ensure that electrical power to the UV lamps and fan is cut off when the first door section is opened. The baffle has an angled shape and slits at an upper flange thereof facing toward the front (incoming) side of the air filter for exposing pathogens in the air to UV radiation before entering the filter, as well as after exiting the filter and entering the main chamber.

The UV system chassis is dimensioned to be retained in the space of a drop ceiling on rails spaced at industry-standard intervals as used for holding standard-size ceiling tiles. For example, U.S. construction standards provide for rails of a drop ceiling to be spaced at 4 foot length and 2 foot width intervals, so the system chassis is dimensioned with a 4×2 foot surface panel and with a depth dimension of about 8 inches to allow insertion at an angle from below upwardly between the rails into the depth space of a drop ceiling.

The system's establishment of a four-leaf-clover pattern of mutually circulating air streams in the typical rectangular office or room space provides the most efficient air movement pattern for moving substantially all the air through the UV system in several complete air changes per hour. Depending upon ceiling height, room size, capacity of air blower, and number and wattage of UV lamps, the system of the invention can provide 99% or higher inactivation of common pathogens in the air and 2 to 7 or more air changes per hour, making it an extremely effective and efficient UV air cleaning and disinfecting system.

Other objects, features, and advantages of the present invention will be explained in the following detailed description of the invention having reference to the appended drawings.

DETAILED DESCRIPTION OF INVENTION

Figure 1:
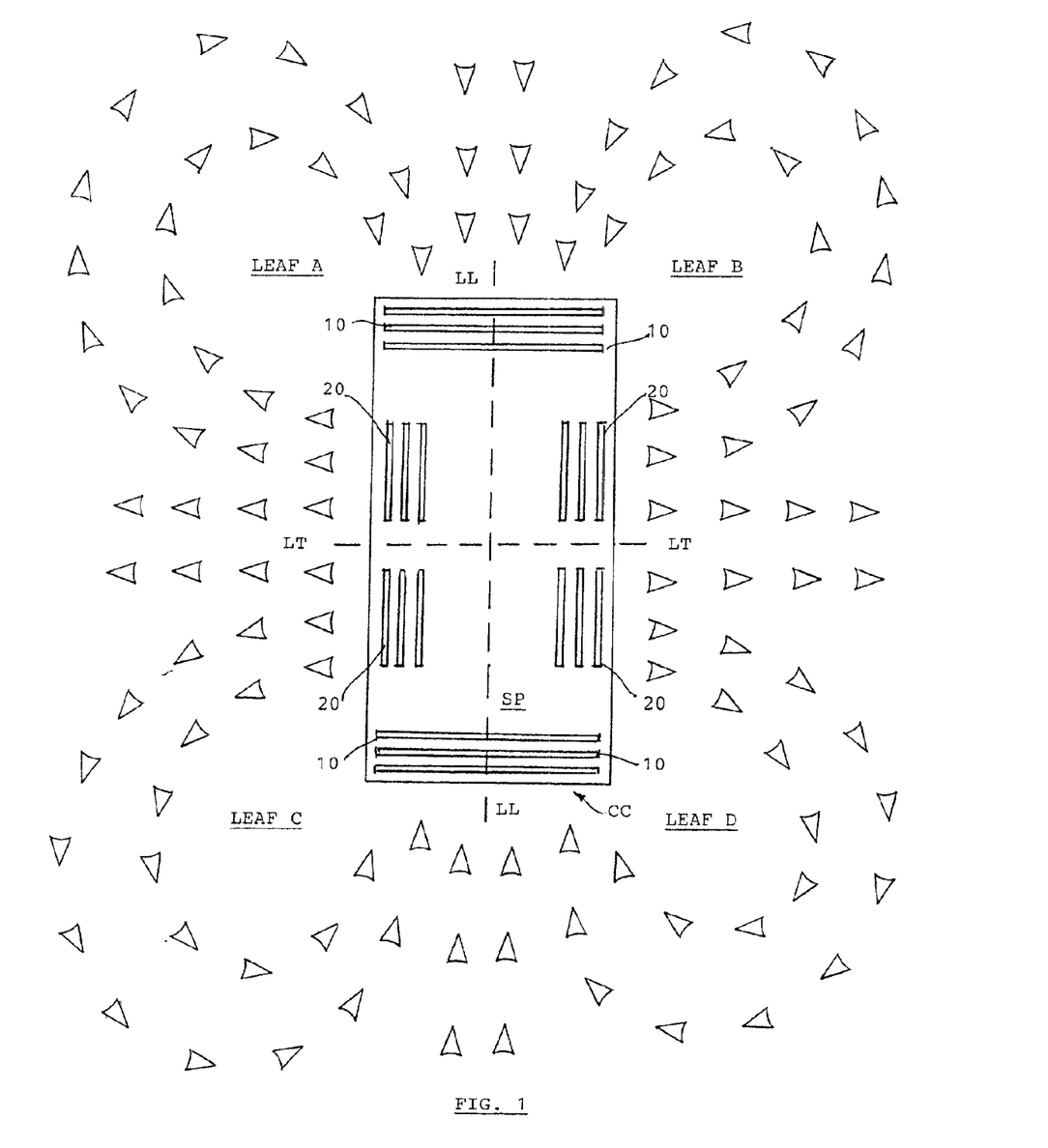
FIG. 1 illustrates a UV air cleaning and disinfecting system in accordance with the invention having inlet and outlet vent arrays that move air in a four-leaf-clover pattern of air streams in a room space.

Referring to FIG. 1, a UV air cleaning and disinfecting system has an enclosed chassis CC provided with an inlet/outlet surface panel SP that faces down from a ceiling surface. The surface panel SP has a longitudinal length along axis LL and a latitudinal width along axis LT. The chassis is to be mounted in a space behind a ceiling surface of a room space with its surface panel substantially coplanar with the ceiling surface and facing into the room space. A pair of inlet vent arrays 10 formed in the inlet/outlet surface panel SP receives incoming air into the chassis. the inlet vent arrays 10 are positioned spaced apart on opposite longitudinal sides of the surface panel from each other. A pair of outlet vent arrays 20 in the surface panel delivers outgoing (cleaned and disinfected) air from the chassis. The outlet vent arrays are spaced apart on opposite latitudinal sides of the surface panel from each other. The four-leaf-clover pattern of mutually circulating air streams in the typical rectangular office or room space provides the most efficient air movement pattern for moving substantially all the air through the UV system in several complete air changes per hour.

The chassis including an air blower unit for intaking air into and delivering air from the chassis, and an ultraviolet (UV) radiation unit for exposing the air to UV rays to kill microbes and pathogens therein. The positioning of the inlet and outlet vent arrays operates to establish a pair of longitudinally opposite incoming air streams (along axis LL) normal to a pair of latitudinally opposite outgoing air streams (along axis LT) which result in four mutually circulating air streams in a four-leaf-clover pattern in the room space, i.e., Leafs A, B, C, and D. The four-leaf-clover pattern properly oriented in a typical rectangular office or room space provides the most efficient air movement pattern for moving substantially all the air through the UV system in several complete air changes per hour. Comparative results for a range of room sizes and unit throughputs are described below.

Figure 2:
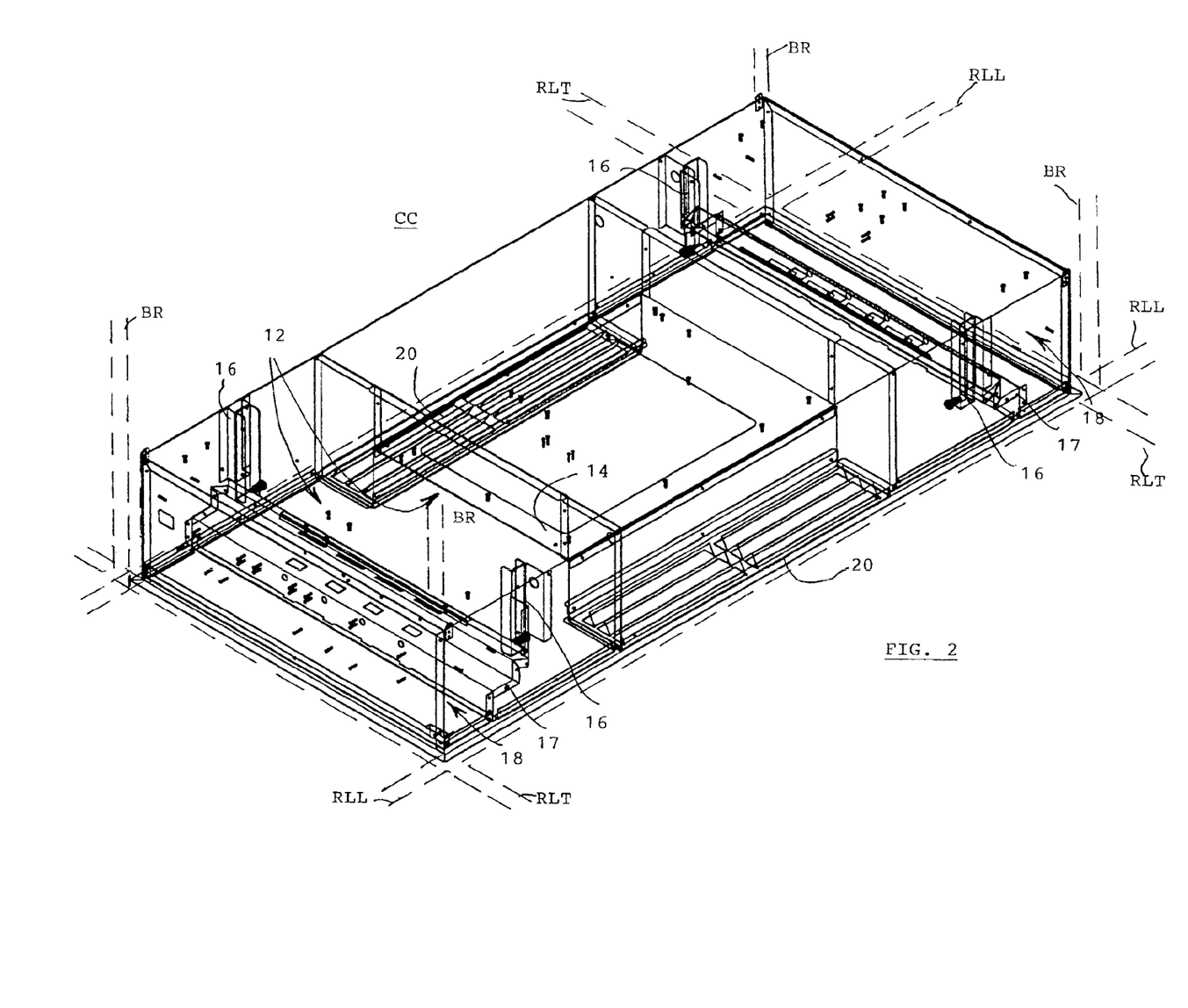
FIG. 2 is a see-through perspective view of the chassis showing its main chamber for an array of UV lamps and air blower, and side chambers for intake of incoming air, as well as mounting relative to the rails and brackets used to hang a standard drop ceiling.

Referring to FIG. 2, the system chassis CC is dimensioned to be retained in the space of a drop ceiling on longitudinal and latitudinal rails RLL and RLT, respectively, which are spaced at industry-standard intervals for holding standard-size ceiling tiles from brackets BR in a drop ceiling. For example, U.S. construction standards provide for rails of a drop ceiling to be spaced at 4-foot length and 2-foot width intervals, so the system chassis is dimensioned with a 4×2-foot (48×24 inch) surface panel SP. The typical drop ceiling has a minimum of 12 inches of depth space. The chassis is mounted by the rails and brackets used to hang a standard drop ceiling, and may also be secured by safety clips to brackets anchored in the ceiling. The chassis can have a depth dimension of about 8 inches to allow easy insertion at an angle from below upwardly between the rails RLL and RLT into the ceiling space and then seated down on the rails. They may also be secured to the rails with sheet metal screws or secured to the ceiling structure with brackets.

The chassis has a main chamber 12 for housing an array of UV lamps formed at a lower elevational position, and an upper housing 14 centered in and positioned at an upper elevational position above the main chamber for housing an air blower. The main chamber is partitioned at its opposite longitudinal ends by panel filters (not shown in FIG. 2) held in filter holders 16 and by UV-blocking baffles 17 which seal off the main chamber 12 from side chambers 18 which are used for the intake of incoming air into the chassis. Cleaned and disinfected air exit on the lateral sides of the air blower housing 14 through the outlet vent arrays 20.

Figure 3A:
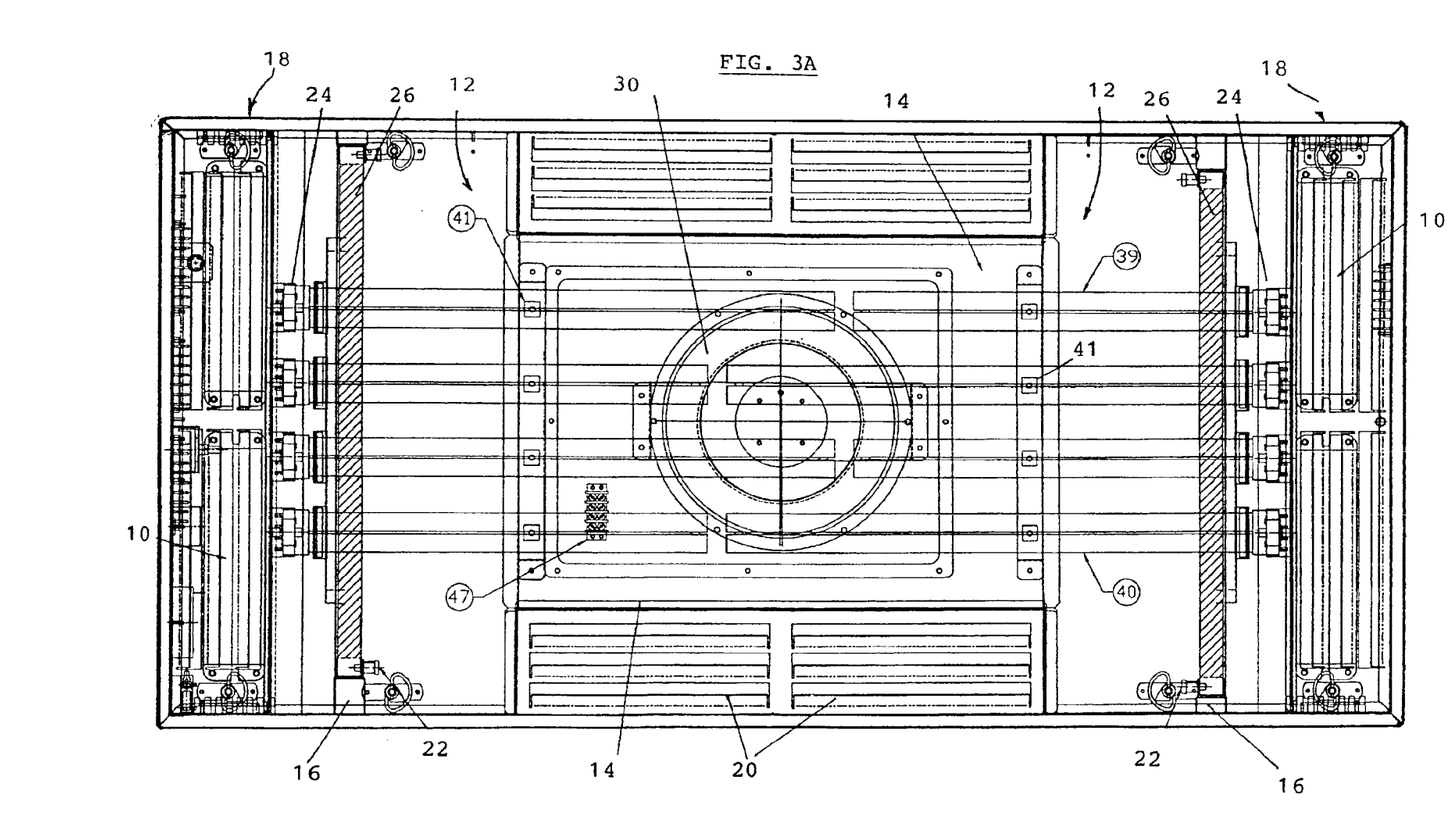
FIG. 3A shows the layout and internal configuration of the baffle, filter, UV lamps, air blower, and inlet-outlet components in the system chassis in plan sectional view.
Figure 3B:
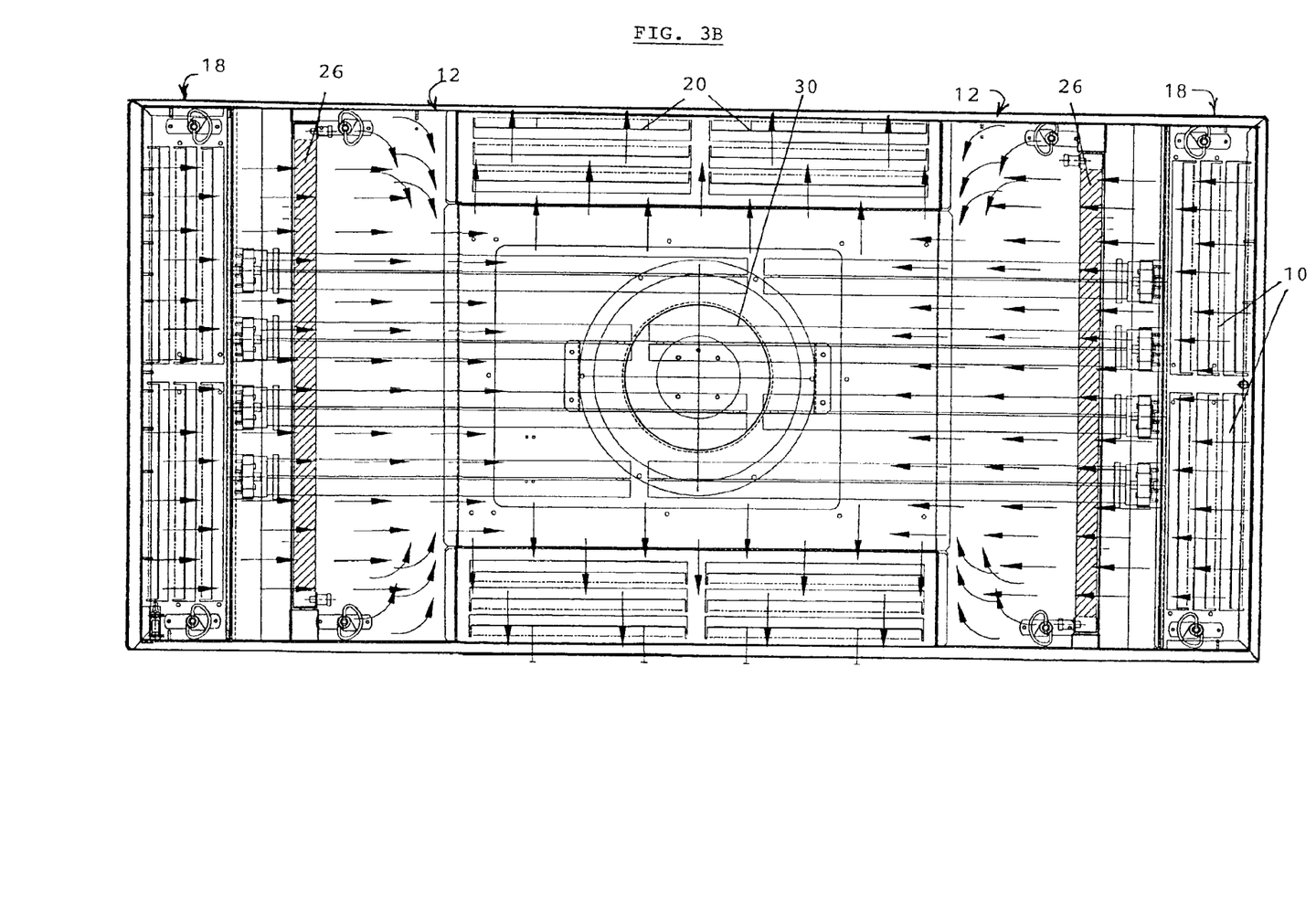
FIG. 3B shows the intake air flow direction therein.

In FIGS. 3A and 3B, the layout and internal configuration of components in the system's chassis is shown in sectional view. The side chambers 18 are on opposite longitudinal side of the main chamber 12. The filters 26 defining the boundary between side and main chambers are held to holders 16 by filter mounting brackets 22. The UV lamp array is located in the main chamber 12, while the air blower 30 is mounted in the upper housing 14 above the main chamber. In this figure, the UV lamp array consists of 4 longer double-tube lamps 40 (e.g. 20" lamps) alternating with 4 shorter double-tube lamps 39 (e.g., 15" lamps). The combined length of a longer lamp 40 and a shorter lamp 39 is about 36 inches (of the 48 inch chassis length). The shorter lamp sections are easier to handle and replace and lower in cost than one long 36-inch lamp. The lamps are held by electrode mountings 24 and lamp supports 41. The UV lamps are arranged longitudinally across the chassis inwardly from the inlet vent arrays 10 in the lower elevational position of the chassis. A terminal block 47 terminates the leads for the air blower motor.

In FIG. 3B, the air flow in the chassis has air streams entering the side inlet vents 10 and passing through the filters 26, then flowing into the main chamber 12 over the UV lamps and into the air blower 30, which blows opposing air streams to the latitudinal sides and out through the outlet vents 20.

Figure 4A:
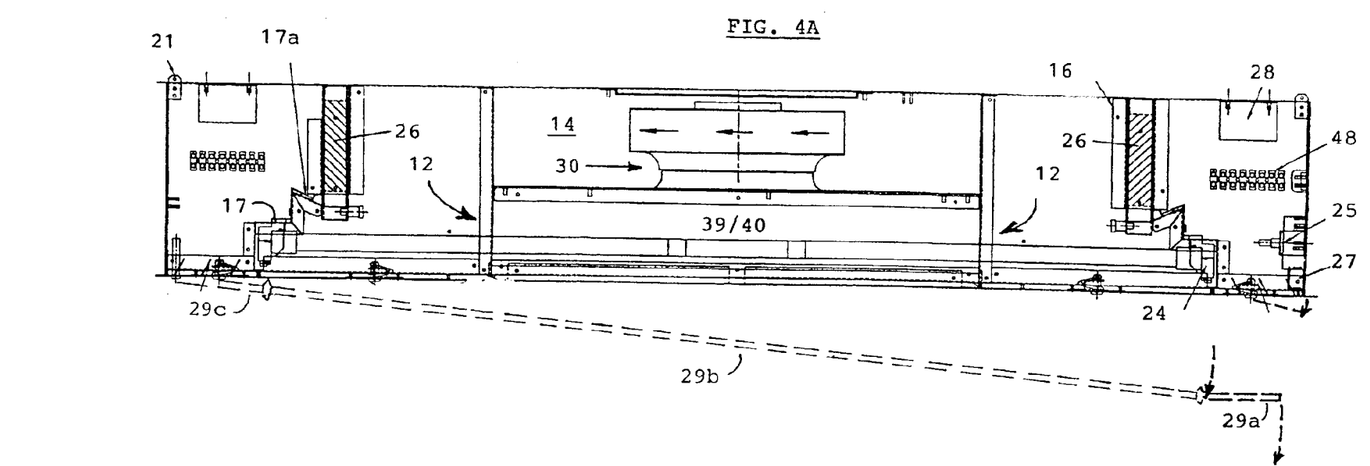
FIG. 4A shows the layout and internal configuration of the components in the system chassis in side sectional view.

In FIG. 4A, the components of the chassis are shown in side sectional view. The baffles 17 and filters 26 (held in holders 16) divide off the side chambers 18 from the main chamber 12. The baffles 17 have slits 17a on an upper flange thereof which allow UV radiation from the lamps to expose the incoming side of the filter 26. The slits 17a are covered with fused silica panes to transmit the UV light but seal off air flow from bypassing the filters through the slits. The air blower 30 is in the upper housing 14 above the air channel over the UV lamps 39, 40 in the main chamber. The AC ballasts 28 for the UV lamps are mounted to the chassis walls in an upper portion of the side chambers 18. Terminal blocks 48 terminate the leads for the UV lamp ballasts. A controller 25 for the air blower motor is mounted to one longitudinal side of the chassis, adjacent a chassis door interlock switch 27.

The surface panel SP is formed with a series of cascading door sections which open to allow wide access across the center of the chassis for maintenance of the UV lamps. The first door section 29a (far right in the figure) opens at the inlet vent array at one longitudinal end of the chassis on an outward side of the UV-blocking baffle 17 shielding the inlet vent array from radiation from the UV lamps. The first door section 29a is connected to an interlock switch 27 that cuts off electrical power to the UV lamps and fan when it is opened. The cascading door is designed so that the first door section 29a must be opened first before the main door section 29b and the third door section 29c at the inlet vent array at the other longitudinal end can be opened in series along their respective hinge joints (indicated by the double dashed lines and downward arrows in the figure). This ensures that the electrical power to the UV lamps will be cut off anytime the surface panel door is opened. The chassis can also have a number of safety clips 21 to fasten the chassis to ceiling brackets for increased stability and safety.

Figure 4B:
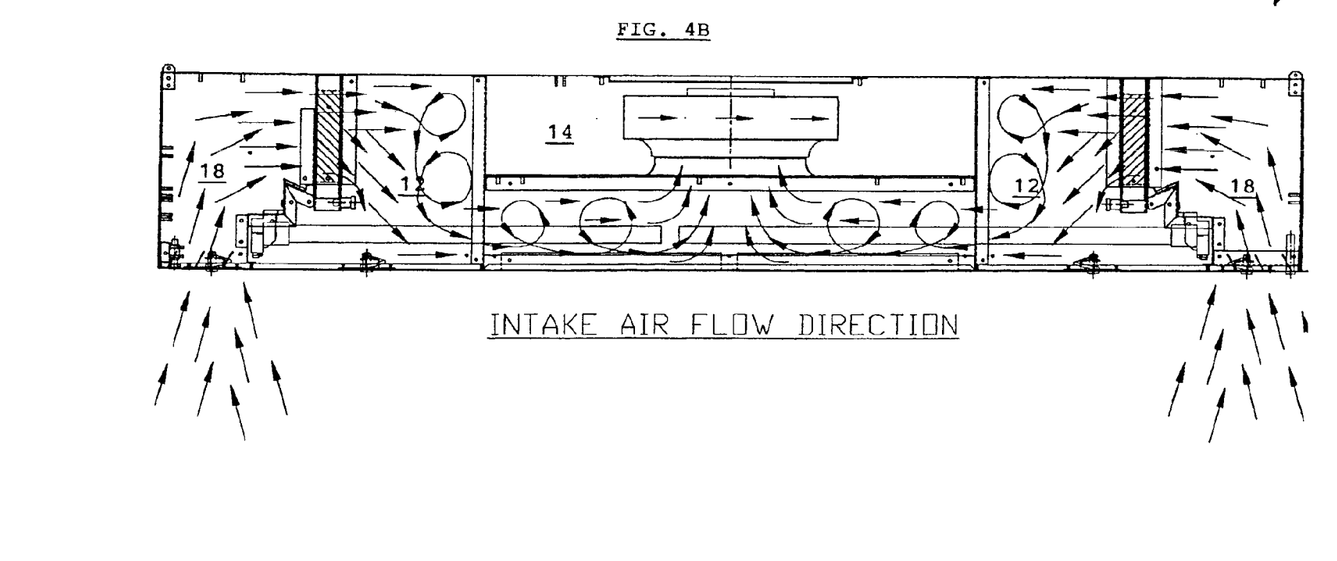
FIG. 4B shows the intake air flow direction therein.

In FIG. 4B, the air flow in the chassis is shown in side view with air streams entering the inlet vents into the side chambers 18, then flowing into the main chamber 12. The baffles direct the incoming air upwardly and through the air filter, then the upper housing directs the air flow downwardly over the UV lamp array into the main channel toward the center of the chassis. The upward and downward movement of the air through the filters on opposite longitudinal sides, followed by movement of the opposing air streams downwardly over the UV lamps toward the center, causes swirling movements which enhance the exposure of pathogens in the air on many sides thereof to ensure effective UV radiation exposure of the pathogens.

Figure 5:
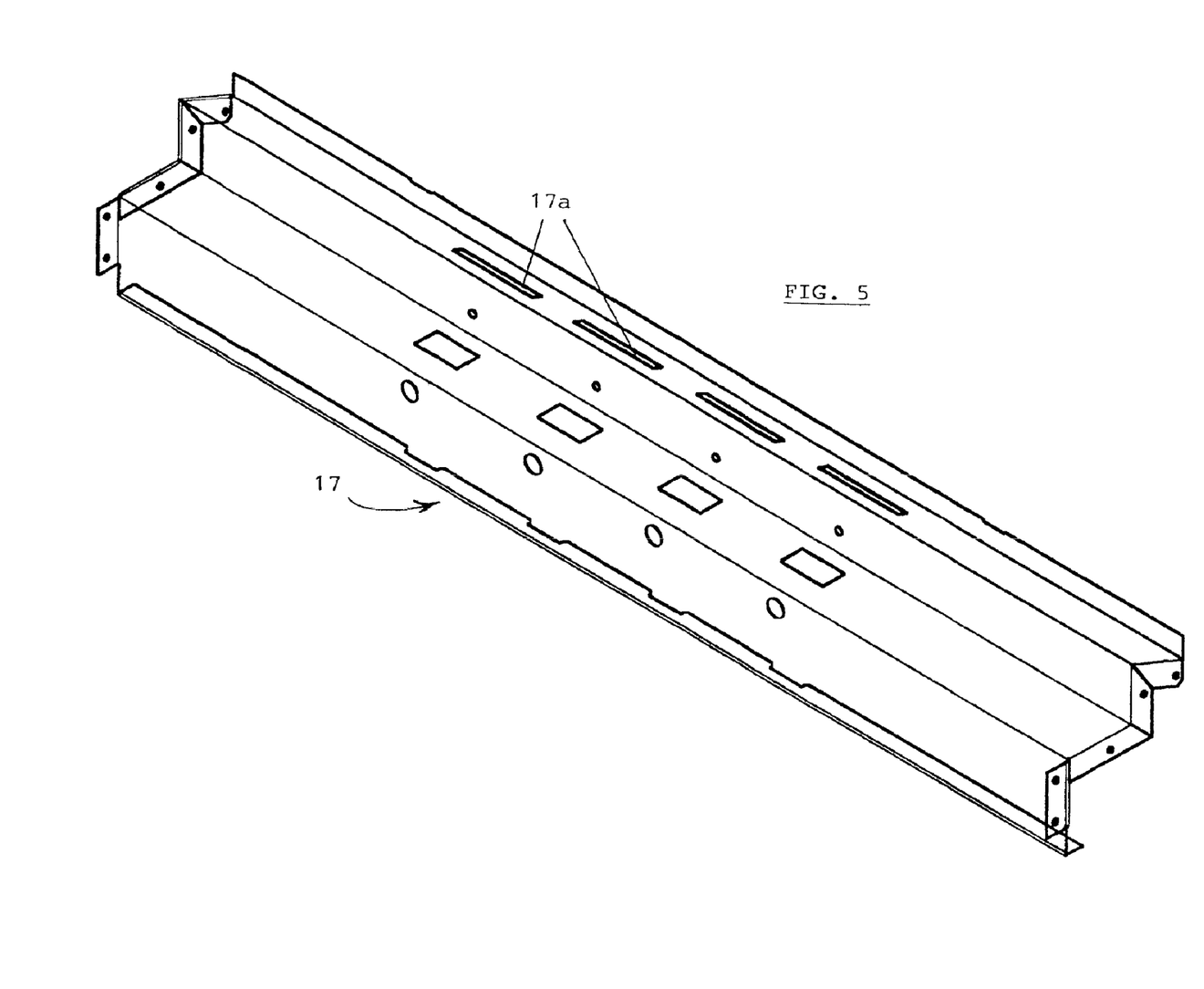
FIG. 5 shows a detail of the baffle used to separate the intake chambers from the main chamber.

In FIG. 5, the baffle 17 is shown in greater detail having an angled shape and slits 17a at the upper flange 17b thereof. The slits face toward the front (incoming) side of the air filter for exposing pathogens to UV radiation before they enter the filter, as well as more completely after they exit the filter and enter the main chamber.

The air on both the incoming and exhaust sides of the filter is disinfected with UV light (254 nanometer). Once the air passes through the filter, the velocity of the air decreases as the air travels through the main disinfecting chamber. The decreased velocity increases air residence time allowing more thorough and complete pathogen elimination. Ultraviolet light inactivates bacteria, viruses, fungi, molds, and spores and breaks down complex bioareosols and volatile organic compounds into simpler compounds. The system draws contaminated room air into its main sterilization chamber and returns sterilized air back to the room. The device mounts in the standard 2'×4' hanging ceiling grid and is installed in a similar manner as a fluorescent fixture. Once installed, the device is flush mounted resulting in no visual obstruction.

The UV system is designed to accommodate UV lamps of varying levels of ultraviolet light. This flexibility allows the purchaser to customize the device for the sterilization level required by the application. After installation, the device can be reconfigured to any sterilization level desired without being removed. The system is designed to maximize pathogen sterilization by utilizing turbulent airflow patterns that extends particle residence time and configuration that increase the ultraviolet field strength. The intake air filters are sterilized on both the supply and discharge sides. The filters are washable and reusable. The device is energy efficient using between about 2 and 4 amps of 120 volt electricity depending on the sterilization level chosen. Computer modeling indicates that the design is extremely effective at inactivating a wide variety of pathogens including *mycobaterium tuberculosis* and *bacillus anthracis* spores.

In preferred embodiments of the UV air cleaning and disinfecting system, superior air sterilization performance is obtained due to the unique structural layout and internal configuration of components described above. A number of novel innovations further contribute to enhance performance. The preferred version utilizes an air blower unit with center-placed backward-curved motorized impeller. Placement of the fan in this position permits the device's air stream to be split into two paths, comprising of two intake air streams and two return air streams. Splitting the airflow in half results in a 50 percent reduction in air velocity for both air streams. Halving the air velocity doubles the pathogen residence time in each air stream. Doubling the pathogen residence time (seconds) doubles the ultraviolet light exposure in each air stream, as energy exposure is expressed as microwatt-seconds per square centimeter. Halving the air velocity also reduces sound decibels related to air movement through the device, especially through the air intake and return vents.

Another feature is the return air channeling being designed to generate turbulence in the air stream in the main sterilization chamber. The channeling acts as a barrier to laminar airflow in the main sterilization chamber. Turbulent airflow produces three significant advantages. First, the path of a particle in turbulent conditions is longer than in laminar airflow conditions. As such, the residence time for a particle in this air stream is increased without extending the length of the device. Increased residence time increases the ultraviolet light dosage that increases pathogen inactivation rates. Second, the tumbling action resulting from the turbulent air conditions increases the probability that all sides of the pathogen will be directly exposed to the ultraviolet emitter. Since many pathogens have an area/areas on their surface that is/are more susceptible to ultraviolet light penetration, increasing the likelihood that all sides of the pathogen are exposed directly to the ultraviolet light emitter increases overall pathogen inactivation rates. Third, because of the circuitous airflow pattern due to the turbulent conditions, the likelihood that a pathogen will remain hidden behind other pathogens throughout their passage through the main sterilization chamber and not directly exposed to the ultraviolet light emitter is greatly reduced that significantly increases pathogen inactivation.

Usage of the backward-curved motorized impeller with inlet ring also extends the sterilization zone. The air stream moves generally in a horizontal direction from the filter to the fan inlet ring. Upon reaching the fan inlet ring, the air stream changes direction 90° and moves vertically upwards through the inlet ring and into the impeller. Since the air stream passing through the inlet ring and into the impeller is exposed to direct and reflected ultraviolet light, the effective sterilization zone is extended by 16.6 percent without extending the horizontal length of the sterilization chamber. Furthermore, the placement of the fan and the positioning of the air streams (intakes and returns) ensure that all access doors are in the intake air stream and under negative pressure. This feature assists in ensuring that the unit maintains an airtight seal during operation.

The return air channeling also provides support for the lamp clips that support the ultraviolet light emitters. These clips eliminate emitter cantilevering and maintain proper lamp alignment for maximizing the effectiveness of the ultraviolet field.

The UV system also employs a specially designed multi-functioning air channel baffle (see FIG. 5) that: (1) provides a door stop for an interlocking door system; (2) creates a barrier between the intake chamber and the main air sterilization chamber; (3) provides support for the ultraviolet emitter lamp holders; (4) provides support for fused silica shields; (5) positions the fused silica shields so that the ultraviolet light passing through these shields is focused on and directed at the supply or upstream side of the filters; (6) provides the bottom seal for the filters; (7) permits differing ultraviolet light power levels that allow the unit to be customized as per the requirements of the application; and (8) permits ease of activating the lamp holder lamp release buttons.

The multi-functioning air channel baffle's (MFACB) doorstop is roughly situated 5/16" from the bottom of the unit and is ½" wide and parallel with the units longitudinal axis. Configured in this manner, the left side air intake door, that engages a safety switch when closed and disengages the safety switch when opened, must be the first access door opened and last door closed during unit servicing. After the left side air intake door is removed, the main air sterilization chamber door can be removed. To ensure that the main air sterilization chamber door can not be opened prior to the removal of the left air intake door, a flange protrudes from the main air sterilization chamber door that rests on top of the left MFACB's door stop and under one side of the left side air intake door. In a similar manner, the right side air intake door is equipped with a flange that sits on top of the right MFACB's door stop and underneath the right side of the main air sterilization chamber door. The advantage of this design is that only one safety switch is used while also ensuring that entry into the main air sterilization chamber can only be accomplished after the left air intake door is removed and the unit is powered down.

The MFACBs provide an airtight seal between the main air sterilization chamber and the two air intake regions as well as lateral strength to the device. The MFACBs also provide a horizontal mounting surface for the ultraviolet light lamp holders and access for the wiring that feeds the lamp holders. The horizontal surface is placed at an elevation designed to maximize the ultraviolet field's effectiveness. The MFACBs mount the fused silica shields that permit continuous sterilization of the supply or intake side of the filters. This feature includes supports for the fused silica shields and apertures for the ultraviolet light to pass through. The MFACBs fused silica shield mounting system in 112.5° declined from vertical so as to focus the ultraviolet light passing through the fused silica shields onto the supply or intake side of the filters. This feature improves the air sterilization level on the supply or intake side of the filter and begins the overall air sterilization prior to entry into the main air sterilization chamber. The MFACBs are then bent back 112.5° to vertical to form the bottom filter seal. This seal creates an airtight seal between the main air sterilization chamber and the intake air channeling. Every unit is equipped with two MFACBs and each MFACB is designed to support up to four ultraviolet lamp holders. A minimum of two lamp holders will always be installed on each MFACB. In cases where only two lamp holders are installed, the unused lamp holder mounting apertures are covered with removable brackets.

The preferred version employs 10.2 watt or 14.5 watt ultraviolet emitters alone or in combination. The length of the main air sterilization chamber eliminates the possibility of using two 14.5 watt emitters end-to-end. A total of six UV lamp combinations are possible:

(a) Four 10.2 watt emitters, two on each MFACB. Total ultraviolet power: 40.8 watts.
(b) Two 10.2 watt emitters on one MFACB and two 14.5 watt emitters on the opposite MFACB. Total ultraviolet power: 49.3 watts.
(c) Four 14.5 watt emitters, two on each MFACB. Total ultraviolet power: 57.8 watts.
(d) Eight 10.2 watt emitters, four on each MFACB. Total ultraviolet power: 81.6 watts.
(e) Six 10.2 watt emitters, four on one MFACB and two on the opposite MFACB with two 14.5 watt emitters. Total ultraviolet power: 90.1 watts.
(f) Four 10.2 watt emitters and four 14.5 watt emitters, two on each MFACB. Total ultraviolet power: 98.6 watts.

The adjustability of the type and number of ultraviolet emitters provided by the MFACB permits the tailoring of the unit to specific applications at minimal expense. Furthermore, this capability ensures that the initial selling, operating, and maintenance costs are minimized for the user. Also, a unit configured for any power level can be reconfigured for any other power level while installed. Notches in the MFACB's doorstop permit easy actuation of the lamp holder's emitter release button.

The return air channel is a unitized design that: (a) provides a seal between the main air sterilization chamber and the return air stream; (b) provides a seal between the fan channel and the return air channel; (c) contains the return air vents and as such eliminates one weld per channel and increases the part's airtight seal, thus inherently providing two of the main air sterilization chamber's door stops; and (d) allows for the passage of electrical power to the fan and ballasts and indicator lamps located in the right side intake air channel of the unit.

Table I is a chart illustrating the room size coverage that can be handled with preferred versions of the UV system of the invention, offered under the trademark NovaAir Strato Series (™), by Air Industries, Inc., based in Kahului, Maui, Hi. This series is equipped with a 460 cubic feet per minute (cfm) air blower (derated 20% for air losses). The room area coverage can range from 2 air changes per hour for a 1,380 sft room with an 8-foot ceiling, to 7 air changes per hour for a 260 sft room with a 12-foot ceiling.

Table 2 illustrates the percent inactivation of pathogens obtained using the NovaAir Strato Series One system (equipped with four 10 watt UV lamps). *Staphyloccus* and *streptococcus* bacteria are inactivated in a range of 92 to 99 percent or higher. *Mycobaterium tuberculosis* is inactivated in a range of 87 to over 99 percent. *Bacillus anthracis* spores is inactivated in a range of over 90 percent.

Table 3 illustrates the percent inactivation of pathogens obtained using the NovaAir Strato Series Two system (equipped with four 14.5 watt UV lamps). *Staphyloccus* and *streptococcus* bacteria are inactivated in a range of 94 to 99 percent or higher. *Mycobaterium tuberculosis* is inactivated in a range of 89 to over 99 percent. *Bacillus anthracis* spores is inactivated in a range of over 92 percent.

Table 4 illustrates the energy requirement as recognized in the industry for 90% and 99% microbial inactivation of pathogens in terms of mws of UV light. The reference source is "Application and Measurement of Ultraviolet Radiation", by Rudolph Nagy, Westinghouse Electric Corporation, published in American Industrial Hygiene Association Journal, Vol. 25, Pages 276 et seq., May–June 1964.

Table 5 shows the ranges of hourly air changes recommended for the Nova Air Strato Series type systems for different applications of indoor environments. For utility and storage room areas, 2 to 2.5 air changes per hour are recommended. For hospitals, doctors' and dentists' offices, pharmacies, and other health room units, from 3 to 7.5 air changes per hour are recommended.

In summary, the system of the invention obtains a very high level of removal of particulates and inactivation of airborne pathogens in office or room air. More than one unit may be used in a room, producing curtains of disinfected air to protect occupants by enveloping them and restricting the transfer of airborne pathogens from one protected area of the room to another. By improving air quality, work place safety, worker productivity, worker morale, and business volume are increased.

It is understood that many modifications and variations may be devised given the above description of the principles of the invention. It is intended that all such modifications and variations be considered as within the spirit and scope of this invention, as defined in the following claims.

TABLE 1

NovaAir Strato Series—Area Coverage *

| 8 Foot Ceiling | 10 Foot Ceiling | 12 Foot Ceiling | Hourly Air Changes |
|---|---|---|---|
| 1,380 Sq. Ft. | 1,104 | 920 | 2 |
| 920 | 736 | 613 | 3 |
| 690 | 552 | 460 | 4 |
| 552 | 442 | 368 | 5 |
| 460 | 368 | 307 | 6 |
| 394 | 315 | 263 | 7 |

* Fan performance calculations include unit air resistance losses resulting in a 368 cubic feet per minute effective air volume at maximum speed with 120 volt 60 Hz electrical power.

TABLE 2

NovaAir Strato Series One
Pathogen Inactivation Percentage-1

| Pathogen | Percent Inactivation-2 |
|---|---|
| *Serratia marcescens* | 87.8716–99.9806 |
| *Escherichia coli* | 56.5885–99.9984 |
| *Staphylococcus aureus* | 92.5966–99.9963 |
| *Streptococcus pyogenes* | 100 |
| *Pseudomonas aeruginosa* | 70.8029–100 |
| *Legionella pneumophila* | 99.7557–99.936 |
| Adenovirus | 79.896 |
| Vaccinia (Poxvirus) | 98.8774 |
| Coxsackie virus | 96.1439 |
| Influenza A virus | 96.9427 |
| Echovirus | 99.9865 |
| Reovirus Type 1 | 99.5629 |
| *Mycobacterium tuberculosis* | 86.8703–99.8097 |
| *Corynebacterium diptheriae* | 86.558 |
| Moraxella-Acinetobacter | 0.585915 |
| *Haemophilus influenzae* | 85.4482 |
| *Bacillus anthracis* (mixed) | 77.5872 |
| *Bacillus anthracis* spores | 90.2988 |
| *Bacillus subtilis* spores | 61.4022 |
| *Penicillium expensum* spores | 40.5515 |
| *Mucor racemosus* spores | 32.7435 |
| *Penicillium italicum* spores | 30.9412 |
| *Fusarium oxysporum* spores | 28.0413 |
| *Cryptococcus neoformans* spores | 25.8956 |
| *Penicillium digitatum* spores | 19.0671 |
| *Aspergillus niger* spores | 18.8528 |
| *Fusarium solani* spores | 18.829 |
| *Aspergillus glaucus* spores | 14.1687 |
| Cladosporium spores | 10.5644 |
| Scopulariopsis spores | 8.16783 |
| Rhizopus nigicans spores | 5.9837 |
| Blue-green algae | 1.34248 |

1-Results from device modeling performed by Ultra Violet Devices, Inc., March 2001.
2-When range of percentages shown, higher value for airborne pathogen inactivation. Where single percentage shown pathogen inactivation percentage based on petre dish inactivation data.

TABLE 3

NovaAir Strato Series Two
Pathogen Inactivation Percentage-1

| Pathogen | Percent Inactivation-2 |
|---|---|
| *Serratia marcesens* | 90.0844–99.9914 |
| *Escherichia coli* | 59.9133–99.9994 |
| *Staphylococcus aureus* | 94.226–99.9986 |
| *Streptococcus pyogenes* | 100 |
| *Pseudomonas aeruginosa* | 74.0411–100 |
| *Legionella pneumophila* | 99.8624–99.9683 |
| Adenovirus | 82.7514 |
| Vaccinia (Poxvirus) | 99.2688 |
| Coxsackie virus | 97.1742 |
| Influenza A virus | 97.8087 |
| Echovirus | 99.9942 |
| Reovirus Type 1 | 99.7398 |
| *Mycobacterium tuberculosis* | 89.1841–99.8954 |
| *Corynebacterium diptheriae* | 88.902 |
| Moraxella-Acinetobacter | 0.641682 |
| *Haemophilus influenzae* | 87.8944 |
| *Bacillus anthracis* (mixed) | 80.5698 |
| *Bacillus anthracis* spores | 92.2361 |
| *Bacillus subtilis* spores | 64.756 |
| *Penicillium expensum* spores | 43.4316 |
| *Mucor racemosus* spores | 35.2432 |
| *Penicillium italicum* spores | 33.3398 |
| *Fusarium oxysporum* spores | 30.2672 |
| *Cryptococcus neoformans* spores | 27.9862 |
| *Penicillium digitatum* spores | 20.6856 |
| *Aspergillus niger* spores | 20.4555 |
| *Fusarium solani* spores | 20.4299 |

TABLE 3-continued

NovaAir Strato Series Two
Pathogen Inactivation Percentage-1

| Pathogen | Percent Inactivation-2 |
|---|---|
| *Aspergillus glaucus* spores | 15.4118 |
| Cladosporium spores | 11.5128 |
| Scopulariopsis spores | 8.91197 |
| *Rhizopus nigicans* spores | 6.53599 |
| Blue-green algae | 1.46972 |

1-Results from device modeling performed by Ultra Violet Devices, Inc., March 2001.
2-When range of percentages shown, higher value for airborne pathogen inactivation. Where single percentage shown, pathogen inactivation percentage based on petre dish inactivation data.

TABLE 4

Energy Requirement for Microbial Inactivation with Ultraviolet Light

| | | Energy (Microwatt-Seconds/ Square Centimeter) | |
|---|---|---|---|
| | | 90% | 99.99% |
| Bacteria | | | |
| *Bacillus anthracis* * | | 4,520 | 8,700 |
| *Salmonella enteritidis* * | | 4,000 | 7,600 |
| *Bacillus Megatherium* sp. (veg.)* | | 1,300 | 2,500 |
| *Bacillus Megatheium* sp. (spores)* | | 2,730 | 5,200 |
| *Bacillus paratyphosus* * | | 3,200 | 6,100 |
| *Bacillus subtilis* * | | 5,800 | 11,000 |
| *Bacillus subtilis* spores* | | 11,600 | 22,000 |
| *Corynebacterium diphtheria* * | | 3,370 | 6,500 |
| *Eberthelia typosa* * | | 2,140 | 4,100 |
| *Escherichia coli* * | | 3,000 | 6,600 |
| *Micrococcus candidus* * | | 6,050 | 12,300 |
| *Micrococcus sphaeroides* * | | 10,000 | 15,400 |
| *Neisseria catarrhalis* * | | 4,400 | 8,500 |
| *Phtomonas tumeficiens* * | | 4,400 | 8,500 |
| *Proteus vulgaris* * | | 3,000 | 6,600 |
| *Pseudomonas aeruginosa* * | | 5,500 | 10,500 |
| *Pseudomonas fluorescens* * | | 3,500 | 6,600 |
| *Salmonella typhimurium* * | | 8,000 | 15,200 |
| *Sarcina lutea* * | | 19,700 | 26,400 |
| *Serratia marcescens* * | | 2,420 | 6,160 |
| *Dysentery bacilli* * | | 2,200 | 4,200 |
| *Shigelia paradysenteriae* * | | 1,680 | 3,400 |
| *Spirillum rubum* * | | 4,400 | 6,160 |
| *Staphylococcus albus* * | | 1,840 | 5,720 |
| *Staphylococcus aureus* * | | 2,600 | 6,600 |
| *Streptococcus hemolyticus* * | | 2,160 | 5,500 |
| *Streptococcus lactis* * | | 6,150 | 8,800 |
| *Streptococcus viridans* * | | 2,000 | 3,800 |
| Yeast | | | |
| *Saccharomyces ellipsoideus* * | | 6,000 | 13,200 |
| Saccharomyoes sp.* | | 8,000 | 17,600 |
| *Saccharomyces cerevisiae* * | | 6,000 | 13,200 |
| Brewers yeast* | | 3,300 | 6,600 |
| Bakers yeast* | | 3,900 | 8,800 |
| Mold Spores | Color | | |
| *Penicillium foquefoli* * | Green | 13,000 | 26,400 |
| *Penicillium expansum* * | Olive | 13,000 | 22,000 |
| *Penicillium digitatum* * | Olive | 44,000 | 88,000 |
| *Aspergillus glaucus* * | Bluish green | 44,000 | 88,000 |
| *Aspergillus flavus* * | Yellowish green | 60,000 | 99,000 |
| *Aspergillus niger* * | Black | 132,000 | 330,000 |
| *Rhisopus nigncans* * | Black | 111,000 | 220,000 |
| *Mucor racemosus* A* | White gray | 17,000 | 35,200 |
| *Mucor racemosus* B* | White gray | 17,000 | 35,200 |
| *Oospora lactis* * | White | 5,000 | 11,000 |
| Virus | | | |
| Adeno Virus Type III** | | | 4,500 |
| Coxsackie A2** | | | 6,300 |
| Infectious Hepatitis** | | | 8,000 |
| Influenza** | | | 3,400 |
| Rotavirus** | | | 24,000 |
| Poliovirus** | | | 21,000 |

*Data aquired from Table II, Incident Energies at 2537 A Radiation Necessary to inhibit Colony Foundation in 90% of the Organisms and for Complete Destruction, Application and Measurement of Ultraviolet Radiation by Rudolph Nagy of Westinghouse Electric Corporation and printed in the American Industrial Hygene Association Journal, Volume 25, Pages 276, May-June 1964.
**Data acquired from Dosage of UV-C in Microwatt sec. square centimeter necessary for complete destruction, NQ Environmental, Inc, 1997.

TABLE 5

NovaAir Strato Series - Suggested Applications for Various Ranges of Hourly Air Changes

| Ranges of Hourly Air Changes | Suggested Applications |
|---|---|
| 2 to 2.5 | Utility and storage rooms and areas that are lightly traveled. |
| 2 to 4 | Offices; government and other office complexes; businesses; schools; restaurants; hotels; and prisons detention areas. |
| 3 to 7.5 | Hospital and clinic hallways, reception, and administrative areas and patient rooms or wards; dentist and doctor offices; pharmacies and drug stores; laboratories; pathologist's; diagnostic and office areas; and prison medical wards. |

I claim:

1. A UV air cleaning and disinfecting system comprising:
   (a) an enclosed chassis having an inlet/outlet surface panel on one planar side thereof, said surface panel having a longitudinal length and a latitudinal width, said chassis being adapted to be mounted in a space behind a ceiling surface of a room space with its surface panel substantially coplanar with the ceiling surface and facing into the room space;
   (b) a pair of inlet vent arrays formed in the inlet/outlet surface panel for taking incoming air into the chassis, said inlet vent arrays being positioned spaced apart on opposite longitudinal sides of the surface panel from each other;
   (c) a pair of outlet vent arrays formed in the inlet/outlet surface panel for delivering outgoing air from the chassis, said outlet vent arrays being positioned spaced apart on opposite latitudinal sides of the surface panel from each other; and
   (d) said chassis including an air blower unit for taking incoming air into the chassis and delivering outgoing air from the chassis, and an ultraviolet (UV) radiation unit for exposing air taken into the chassis to UV rays sufficient to kill microbes and pathogens therein before it is delivered from the chassis;

(e) wherein said pair of inlet vent arrays positioned on opposite longitudinal sides and said pair of outlet vent arrays positioned on opposite latitudinal sides of the surface panel are operative to establish a pair of longitudinally opposite incoming air streams normal to a pair of latitudinally opposite outgoing air streams which result in four mutually circulating air streams in a four-leaf-clover pattern in the room space.

2. A UV air cleaning and disinfecting system according to claim 1, wherein for an air blower unit of about 460 cfm throughput, the circulating air streams of the four-leaf-clover pattern obtains in the range of from 2 air changes per hour for a 1,380 sft room with an 8-foot ceiling to 7 air changes per hour for a 260 sft room with a 12-foot ceiling.

3. A UV air cleaning and disinfecting system comprising:
(a) an enclosed chassis having an inlet/outlet surface panel on one planar side thereof, said surface panel having a longitudinal length and a latitudinal width, said chassis being adapted to be mounted in a space behind a ceiling surface of a room space with its surface panel substantially coplanar with the ceiling surface and facing into the room space;
(b) a pair of inlet vent arrays formed in the inlet/outlet surface panel for taking incoming air into the chassis, said inlet vent arrays being positioned spaced apart on opposite longitudinal sides of the surface panel from each other;
(c) a pair of outlet vent arrays formed in the inlet/outlet surface panel for delivering outgoing air from the chassis, said outlet vent arrays being positioned spaced apart on opposite latitudinal sides of the surface panel from each other; and
(d) said chassis including an air blower unit for taking incoming air into the chassis and delivering outgoing air from the chassis, and an ultraviolet (UV) radiation unit for exposing air taken into the chassis to UV rays sufficient to kill microbes and pathogens therein before it is delivered from the chassis;
(e) wherein said chassis has a main chamber with an array of UV lamps arranged longitudinally across the chassis inwardly from the pair of inlet vent arrays and at a lower elevational position of the chassis, the inlet vent arrays is provided with respective ones of a pair of air filters for the incoming air at the opposite longitudinal sides of the chassis, and the air blower unit is provided in the center of the chassis at an upper elevational position from the array of UV lamps.

4. A UV air cleaning and disinfecting system according to claim 3, wherein the inlet vent arrays are housed in respective intake chambers separated from the main chamber by UV-blocking baffles to direct incoming air entering the inlet vents upwardly in elevational position in the chassis through the air filter then downwardly over the UV lamp array toward the center of the chassis, where it is then entrained by the air blower unit and blown latitudinally outward on opposite sides through the outlet vent arrays in the surface panel, said upward and downward air movements causing air swirling movements for ensuring that pathogens in the incoming air are exposed on many sides thereof to radiation from the UV lamp array.

5. A UV air cleaning and disinfecting system according to claim 4, wherein the UV-blocking baffle has an angled shape and slits at an upper flange thereof facing only toward a front (incoming) side of the air filter for exposing pathogens in the incoming air to UV radiation on the front side of the air filter, as well as after exiting the filter and entering the main chamber.

6. A UV air cleaning and disinfecting system according to claim 5, wherein the slits in the UV-blocking baffle are covered by fused silica shields and positioned such that ultraviolet light passing through these shields is focused on and directed at the front side of the filter.

7. A UV air cleaning and disinfecting system according to claim 5, wherein the UV-blocking baffle also provides a horizontal mounting surface for holders for the UV lamp array.

8. A UV air cleaning and disinfecting system according to claim 3, wherein said surface panel is formed with a series of cascading door sections to allow wide access across the center of the chassis for maintenance of the UV lamp array.

9. A UV air cleaning and disinfecting system according to claim 8, wherein said cascading door sections include a first door section adjacent the inlet vent array at one longitudinal end of the chassis positioned on an outward side of the UV-blocking baffle, said first door section being connected to an interlock switch to cutoff electrical power to the UV lamp array and air blower unit when the first door section is opened.

10. A UV air cleaning and disinfecting system according to claim 3, wherein said chassis is dimensioned to be retained in the ceiling space on longitudinal and latitudinal rails spaced at industry-standard intervals for holding standard-size ceiling tiles from brackets in a drop ceiling.

11. A UV air cleaning and disinfecting system according to claim 10, wherein the longitudinal and latitudinal rails are spaced at 4 foot length and 2 foot width intervals.

12. A UV air cleaning and disinfecting system according to claim 11, wherein said chassis is dimensioned with a 4×2 foot surface panel and with a depth dimension of about 8 inches to allow insertion at an angle from below upwardly between the rails into a standard minimum 12-inch depth space of a drop ceiling.

13. A UV air cleaning and disinfecting system according to claim 11, wherein for an air blower unit of about 460 cfm throughput, the circulating air streams of the four-leaf-clover pattern obtains in the range of from 2 air changes per hour for a 1,380 sft room with an 8-foot ceiling to 7 air changes per hour for a 260 sft room with a 12-foot ceiling.

14. A UV air cleaning and disinfecting system according to claim 11, wherein said chassis is equipped with four 10 watt UV lamps, and *staphyloccus* and *streptococcus* bacteria are inactivated in a range of 92 to 99 percent or higher.

15. A UV air cleaning and disinfecting system according to claim 14, wherein *mycobaterium tuberculosis* is inactivated in a range of 87 to over 99 percent.

16. A UV air cleaning and disinfecting system according to claim 14, wherein *bacillus anthracis* spores is inactivated in a range of over 90 percent.

17. A UV air cleaning and disinfecting system according to claim 11, wherein said chassis is equipped with four 14.5 watt UV lamps, and *staphyloccus and streptococcus* bacteria are inactivated in a range of 94 to 99 percent or higher.

18. A UV air cleaning and disinfecting system according to claim 17, wherein *mycobaterium tuberculosis* is inactivated in a range of 89 to over 99 percent.

19. A UV air cleaning and disinfecting system according to claim 17, wherein *bacillus anthracis* spores is inactivated in a range of over 92 percent.

20. A UV air cleaning and disinfecting system according to claim 3, wherein said air blower unit has a center-placed backward-curved motorized impeller, which causes the incoming air stream to be split into two paths, comprising of two intake air streams and two return air streams.

* * * * *